United States Patent
Nguyen et al.

(10) Patent No.: US 11,761,715 B2
(45) Date of Patent: Sep. 19, 2023

(54) HEAT EXCHANGER

(71) Applicant: Mahle International GmbH, Stuttgart (DE)

(72) Inventors: Chi-Duc Nguyen, Stuttgart (DE); Nicolas Ferrand, Stuttgart (DE)

(73) Assignee: Mahle International GmbH

(*) Notice: Subject to any disclaimer, the term of this patent is extended or adjusted under 35 U.S.C. 154(b) by 145 days.

(21) Appl. No.: 17/351,818

(22) Filed: Jun. 18, 2021

(65) Prior Publication Data

US 2021/0396480 A1 Dec. 23, 2021

(30) Foreign Application Priority Data

Jun. 18, 2020 (DE) .......................... 102020207552.2

(51) Int. Cl.
  *F28F 3/08* (2006.01)
  *F28F 9/02* (2006.01)
  *F28F 9/12* (2006.01)

(52) U.S. Cl.
  CPC ............ *F28F 3/086* (2013.01); *F28F 9/0224* (2013.01); *F28F 9/12* (2013.01)

(58) Field of Classification Search
  CPC .. F28F 9/001; F28F 9/002; F28F 9/005; F28F 9/013; F28F 9/06; F28F 9/12; F28F 9/0131; F28F 9/0251; F28F 9/0224; F28F 2280/06
  See application file for complete search history.

(56) References Cited

U.S. PATENT DOCUMENTS

| | | | | |
|---|---|---|---|---|
| 6,196,304 | B1* | 3/2001 | Schwarz | F28F 9/0221 165/140 |
| 7,082,988 | B2* | 8/2006 | Yoshida | F28F 9/0236 165/81 |
| 9,328,968 | B2 | 5/2016 | Vanderwees | |
| 10,048,013 | B2 | 8/2018 | Gruener et al. | |
| 2008/0156472 | A1* | 7/2008 | Maucher | B23K 1/0012 165/170 |
| 2012/0061053 | A1* | 3/2012 | Geskes | F28F 9/0224 165/67 |
| 2014/0352935 | A1* | 12/2014 | Gruener | F28D 9/0062 165/166 |
| 2015/0323266 | A1* | 11/2015 | Bardeleben | F28F 9/0075 165/76 |

FOREIGN PATENT DOCUMENTS

| | | | | |
|---|---|---|---|---|
| DE | 102010001828 A1 * | 8/2011 | ............ | F28D 9/005 |
| DE | 102011080824 A1 | 2/2013 | | |
| DE | 112012004508 T5 | 9/2014 | | |
| WO | WO-2007038871 A1 | 4/2007 | | |

* cited by examiner

*Primary Examiner* — Jianying C Atkisson
*Assistant Examiner* — For K Ling
(74) *Attorney, Agent, or Firm* — Fishman Stewart PLLC

(57) ABSTRACT

A heat exchanger for a motor vehicle may include a tube block and a flange. The tube block may multiple first medium channels and multiple second medium channels. The first and the second medium channels may extend from an inlet of the tube block to an outlet of the tube block. A medium to be cooled may flow through the first medium channels. A cooling medium may flow through the second medium channels. The flange may be configured to receive the tube block about the outlet in a fluid-tight manner. The flange may be plate-like and may have a surrounding bolting region that may be formed about the tube block.

17 Claims, 4 Drawing Sheets

HEAT EXCHANGER

CROSS-REFERENCE TO RELATED APPLICATION

This application claims priority to German Application No. DE 10 2020 207 552.2 filed on Jun. 18, 2020 the contents of which are hereby incorporated by reference in its entirety.

TECHNICAL FIELD

The invention relates to a heat exchanger for a motor vehicle.

BACKGROUND

A heat exchanger is employed in a motor vehicle for cooling a medium to be cooled by means of a cooling medium. This can be for example a charge air cooler, in which the charge air is cooled by the cooling water. There, the charge air cooler comprises a tube block of aluminium, through which charge air and cooling water flows. The charge air flows via an inlet into the tube block and via an outlet out of the tube block. Usually, an air box or a flange of plastic is mounted to the inlet by a so-called crimping. On the outlet, both an air box or a flange of plastic can be mounted by crimping and also a flange of aluminium by soldering or welding. The air box or the flange on the outlet can then be directly bolted to an engine block. Disadvantageously, such flanges have a major thickness which increases installation space in the flow direction of the charge air and increases costs.

SUMMARY

The object of the invention therefore is to state for a heat exchanger of the generic type an improved or at least alternative embodiment, with which the described advantages are overcome. In particular, the heat exchanger should have a low installation space requirement.

A heat exchanger is provided for a motor vehicle.

The heat exchanger comprises a tube block which comprises multiple first medium channels and multiple second medium channels. The first medium channels can be flowed through by a medium to be cooled from an inlet of the tube block to an outlet of the tube block and the second medium channels can be flowed through by a cooling medium. In addition, the heat exchanger comprises a flange in which the tube block, round about the outlet, is received in a fluid-tight manner. According to the invention, the flange is plate-like and comprises a surrounding bolting region. Here, the bolting region is formed about the tube block and directed to the outside transversely to the flow direction of the medium to be cooled.

The flange according to the invention is plate-like, so that altogether the installation space requirement for the flange is reduced. The term "plate-like" means in this context that the thickness of the flange is multiple times smaller than its height and its width. The thickness of the flange is defined in the outlet of the tube block in the flow direction of the medium to be cooled. The bolting region is formed about the outlet and accordingly ring-like. The bolting region is provided for the direct bolting to further components of the motor vehicle, so that no further elements for fixing the heat exchanger are necessary. For bolting the flange to the further components of the motor vehicle, continuous bolt holes can be provided. Altogether, the weight and the costs of the heat exchanger according to the invention can be reduced. It is to be understood that the first medium channels and the second medium channels are fluidically separated from one another.

Preferentially, the heat exchanger according to the invention is a charge air cooler. Then, medium to be cooled is charge air and the cooling medium can be for example cooling water. The second medium channels are then formed by flat tubes and the first medium channels are then formed by intermediate spaces between the flat tubes. The charge air cooler can then be directly bolted to the engine block or the intake bridge of the motor vehicle via the flange.

Advantageously, the tube block can be formed from aluminium. Advantageously, the flange can be formed of plate. Advantageously, the plate can be an aluminium plate. Advantageously, the plate can have a thickness between 1.5 mm and 2.5 mm. The thickness of the plate can be selected within the mentioned value range dependent on load and the size of the heat exchanger.

In an advantageous embodiment of the heat exchanger it can be provided that the flange is formed in two layers in the bolting region. There, a first material layer can be formed by the material of the flange and a second material layer by a separate plate-like frame. There, the plate frame follows in its contour the shape of the first material layer in the bolting region and serves for a reinforcement or a stiffening of the flange in the bolting region. For better mounting, the frame can be in multiple parts. Advantageously, the plate of the frame can be a steel plate. Advantageously, the first material layer and the second material layer can be integrally bonded to one another. Advantageously, the first material layer and the second material layer can be soldered to one another.

In an advantageous embodiment of the heat exchanger it can be provided that the flange in the bolting region is formed in two material layer by a folding of the first material layer by 180°. In other words the flange is folded in the bolting region and by way of this reinforced or stiffened in the bolting region. Advantageously, the first material layer and the second material layer can be connected to one another in an integrally bonded manner. Advantageously, the first material layer and the second material layer can be soldered to one another.

In order to further increase the stiffness of the flange in the bolting region, multiple beads can be formed in the bolting region. The beads can have a shape or size deviating from one another and are practically arranged distributed in the bolting region and between continuous bolt holes in the bolting region. When the first material layer and the second material layer are soldered to one another, a fixed soldered connection between the two material layer is created on the beads. Advantageously, openings for applying a fluxing agent between the two material layers can be formed within the beads in the first material layer or in the second material layer. Through the openings, the fluxing agent can enter between the two material layers and the two material layers thereby securely soldered to one another.

Advantageously, it can be provided that on the flange outside the bolting region a surrounding receiving contour is formed. In the receiving contour, the tube block is then received in the flow direction of the medium to be cooled and connected to the flange in an integrally bonded manner. Preferentially, the tube block and the flange are soldered to one another within the receiving contour. Transversely to the flow direction of the medium to be cooled in the outlet, the receiving contour is located radially inside and the bolting region radially outside.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention. Preferred exemplary embodiments of the invention are shown in the drawings and are explained in more details in the following description, wherein same reference numbers relate to same or similar or functionally same components.

BRIEF DESCRIPTION OF THE DRAWINGS

It shows, in each case schematically.

DETAILED DESCRIPTION

Figure 1:
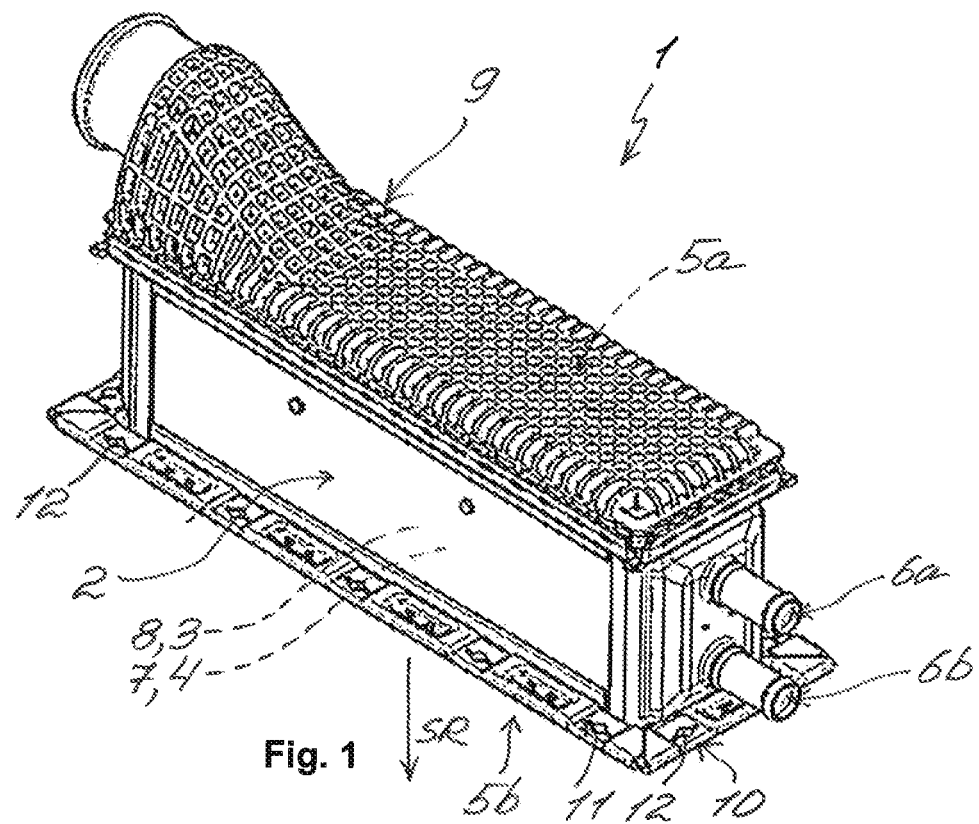
FIG. 1 a view of a heat exchanger according to the invention with a flange in a first embodiment.

FIG. 1 shows a view of a heat exchanger 1 according to the invention—here a charge air cooler—for a motor vehicle. The heat exchanger 1 comprises a tube block 2, which comprises multiple first medium channels 3 and multiple second medium channels 4—see in particular FIG. 5—in this regard. Here, the medium channels 3 and 4 are arranged within the tube block 2. The first medium channels 3 and the second medium channels 4 are fluidically separated from one another. The first medium channels 3 can be flowed through by a medium to be cooled—here charge air—from an inlet 5a to an outlet 5b of the tube block 2. The second medium channels 4 can be flowed through by a cooling medium—here cooling water—from a further inlet 6a to a further outlet 6b of the tube block 2. The second medium channels 4 are flat tubes 7—see in particular FIG. 5 in this regard—and the first medium channels 3 are formed by intermediate spaces 8 between the flat tubes 7.

The inlet 5a of the tube block 2 is fluidically connected to a distribution box 9 of the heat exchanger 1, which conducts and distributes the medium to be cooled to the inlet. Here, the tube block 2 is formed from aluminium and the distribution box 9 from plastic and crimped to the tube block 2. By way of the outlet 5b, the medium to be cooled is conducted out of the heat exchanger 1. On the outlet 5b, a flange 10 of the heat exchanger 1 is mounted, in which the tube block 2 is received about the outlet 5b in a fluid-tight manner. The flange 10 is formed of aluminium plate and soldered or welded to the tube block 2. The aluminium plate can have a thickness between 1.5 mm and 2.5 mm.

The flange 10 is plate-like and because of this formed, in particular, in an installation space-saving manner. The flange 10 additionally comprises a surrounding bolting region 11 which is formed about the tube block 2 and transversely to the flow direction SR of the medium to be cooled—here charge air—directed in the outlet 5b to the outside. Here, the bolting region 11 is provided for the direct bolting to further components of the motor vehicle. To this end, continuous bolt holes 12th are provided in the bolting region 11. Here, the flange 10 is shown in a first embodiment which is explained in more detail by way of FIG. 2 to FIG. 5.

Figure 2:
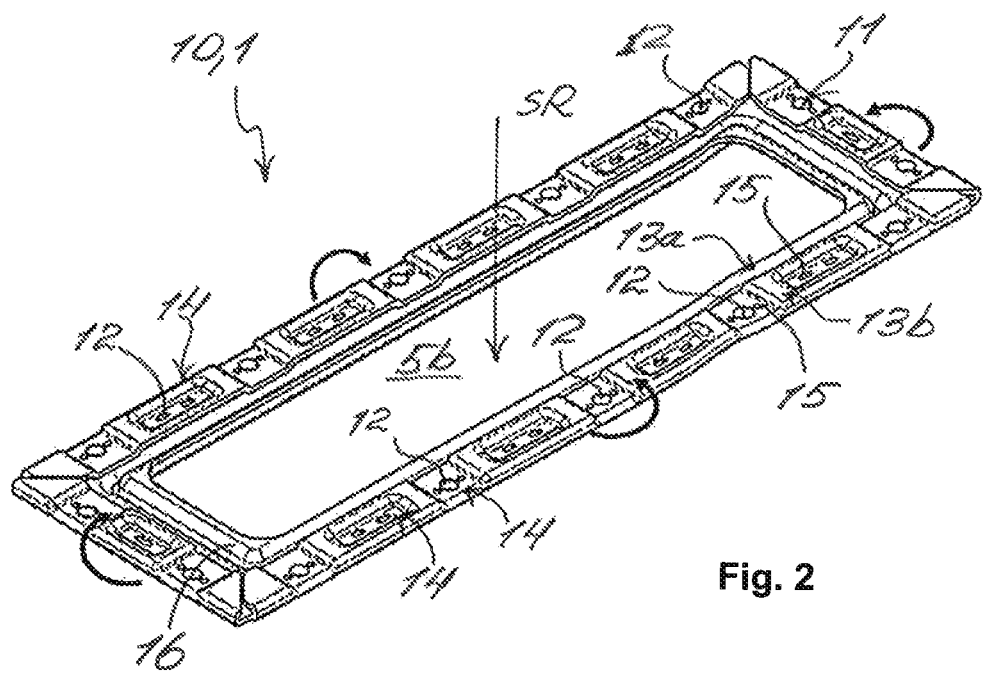
FIGS. 2 and 3 a view and an enlarged view of the flange in the first embodiment.
Figure 3:
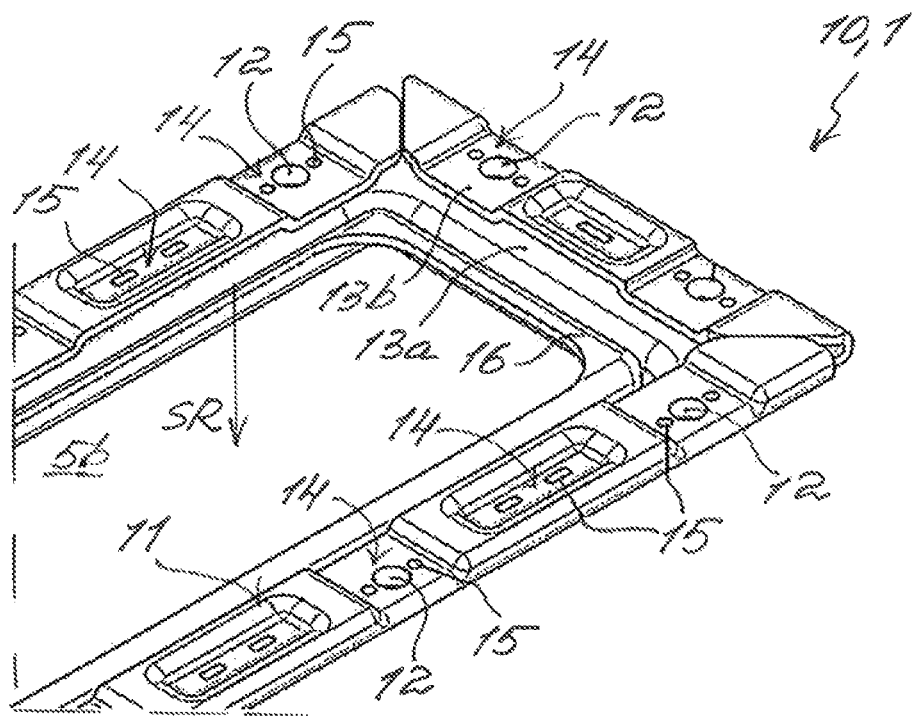

FIG. 2 shows a view and FIG. 3 shows an enlarged view of the flange 10 in the first embodiment. Here, the flange 10 is formed in two layers in the bolting region 11, wherein a first material layer 13a is formed from the material of the flange 10 and a second material layer 13b by a folding of the first material layer 13a by 180°. The folding is indicated by arrows in FIG. 2. Through the folding in the bolting region 11, the same is additionally reinforced or stiffened. As is particularly clearly noticeable in FIG. 3, corners of the bolting region 11 are cut off at 90°. By way of this, the bolting region 11 is also formed in two layers in the corner regions of the flange 10.

In the bolting region 11, multiple beads 14 are additionally formed, which additionally stiffen the flange 10 in the bolting region 11. The two material layers 13a and 13b lie against one another within the beads 14 and are soldered to one another. Within the beads 14, openings 15 are additionally formed in the second layer through which a fluxing agent for soldering the two materials layers 13a and 13b can be particularly easily applied. By contrast, the bolt openings 12 appropriately pass through the two material layers 13a and 13b.

Figure 4:
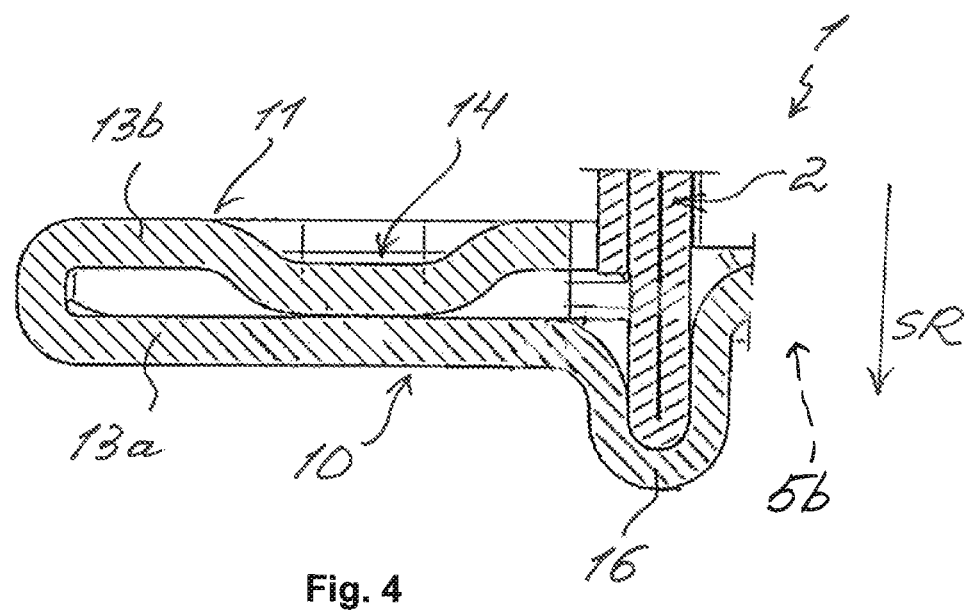
FIGS. 4 and 5 sectional views of the heat exchanger with the flange in the first embodiment.

FIG. 4 shows a sectional view of the heat exchanger 1 with the flange 10 in the first embodiment. Here it is particularly clearly noticeable that the two material layers 13a and 13b lie against one another within the bead 14 and are soldered to one another. Furthermore, a surrounding receiving contour 16 is also noticeable, which is formed in the flange 10 for the tube block 2. The tube block 2 is then received in the receiving contour 16 about the outlet 5b in a fluid-tight manner and soldered or welded to the flange 10.

Figure 5:
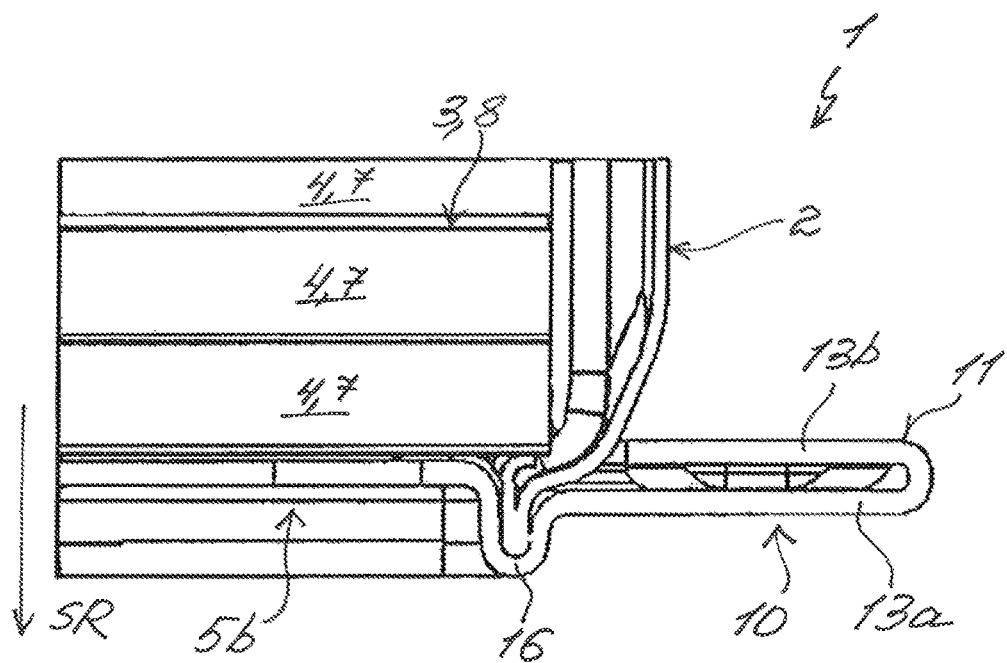

FIG. 5 shows a further sectional view of the heat exchanger 1 with the flange 10 in the first embodiment. As already explained above, the tube block comprises multiple flat tubes 7, which form the second medium channels 4 for the cooling medium—here cooling water. In the intermediate spaces 8 formed between the flat tubes 7, the first medium channels 3 are then formed for the medium to be cooled—here charge air.

Figure 6:
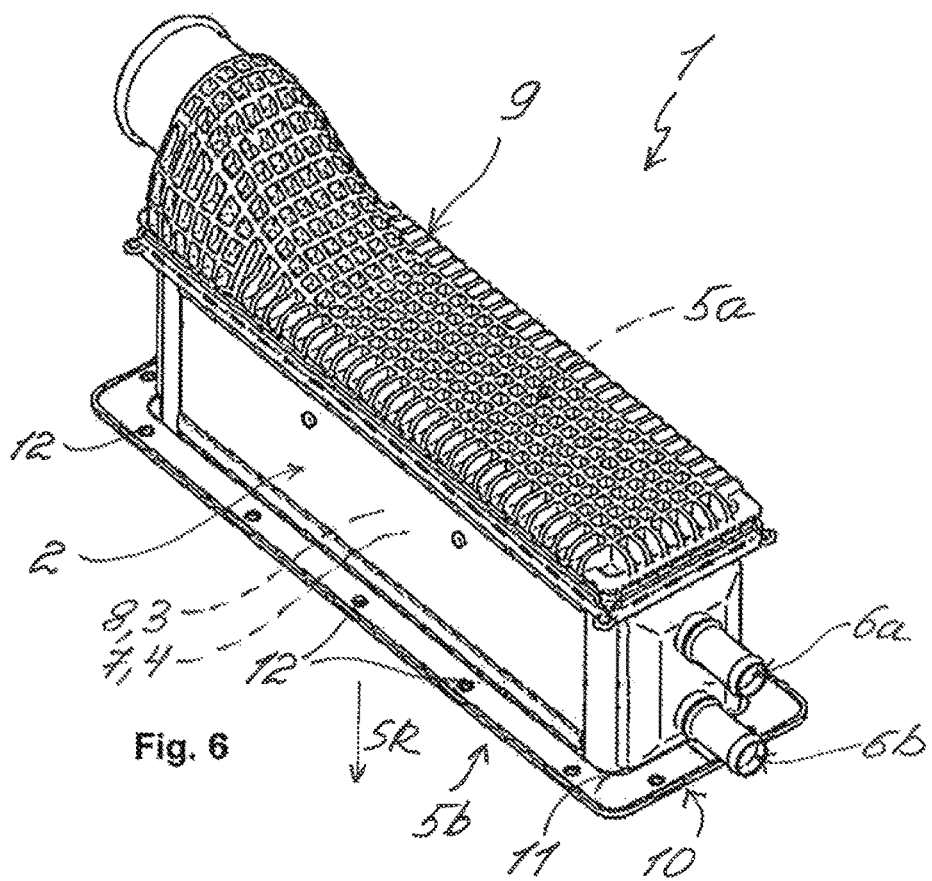
FIGS. 6 and 7 a view and an exploded view of the heat exchanger with the flange in a second embodiment.
Figure 7:
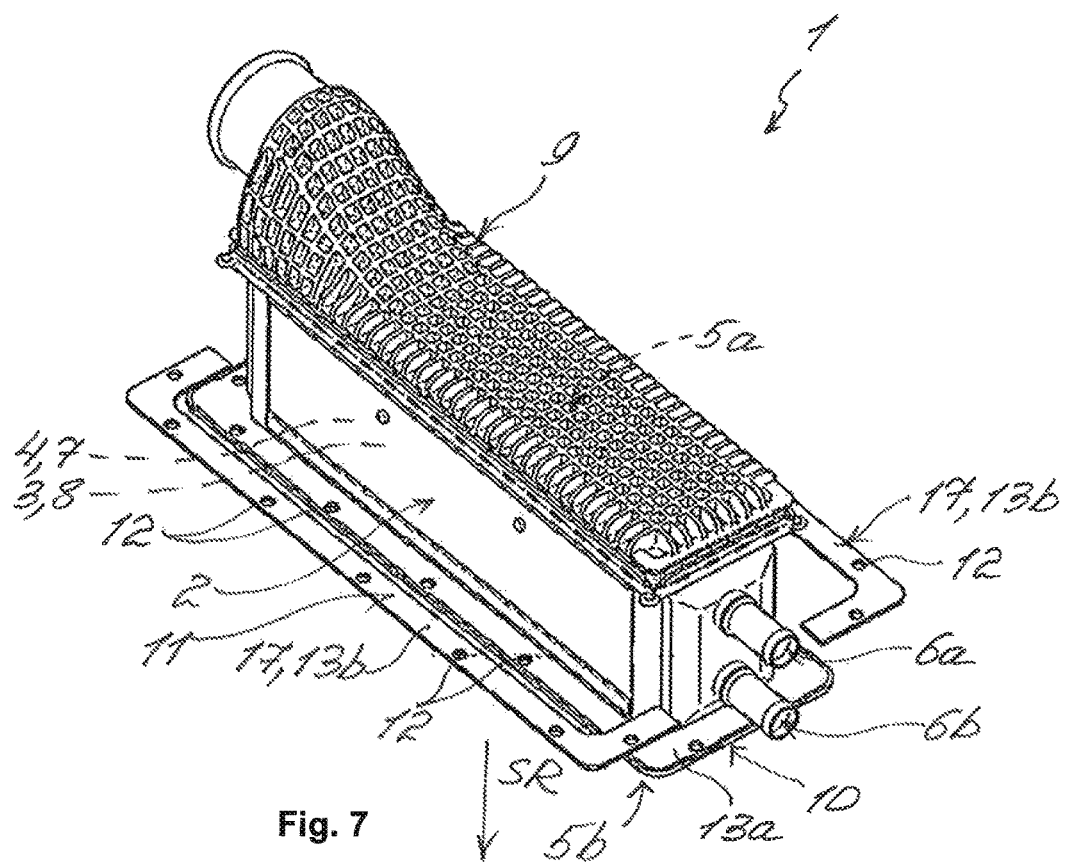

FIG. 6 shows a view and FIG. 7 shows an exploded view of the heat exchanger 1 according to the invention with the flange 10 in a second embodiment. The flange 10 is also formed in two layers in the second embodiment, wherein here the second material layer 13a is formed by the material of the flange 10 and the second material layer 13b by a two-part frame 17 of steel plate. The second material layer 13b or the frame 17 is soldered to the first material layer 13b.

Figure 8:
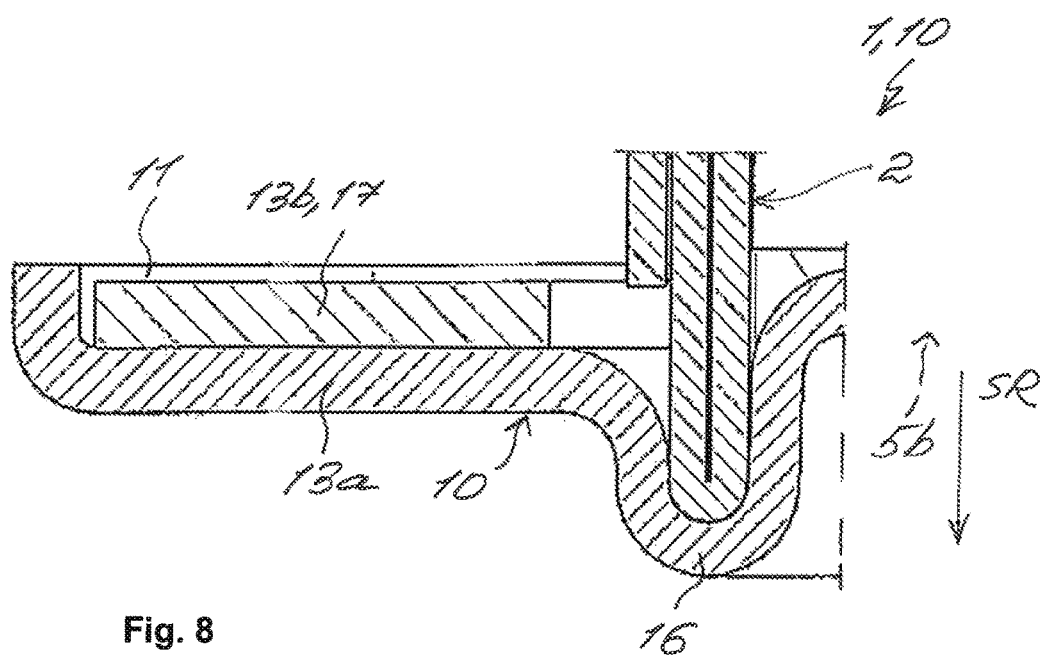
FIG. 8 a sectional view of the heat exchanger with the flange in the second embodiment.

In FIG. 8, a sectional view of the heat exchanger 1 with the flange in the second embodiment is shown. The second material layer 13b or the frame 17 lies against the first material layer 13a with its entire surface area, so that the two material layers 13a and 13b are soldered to one another over the entire surface area of the second material layer 13b or of the frame 17.

The invention claimed is:

1. A heat exchanger for a motor vehicle, comprising:
a tube block including multiple first medium channels and multiple second medium channels,
the first medium channels extend from an inlet of the tube block to an outlet of the tube block, and a medium to be cooled flows through the first medium channels and a cooling medium flows through the second medium channels; and a flange configured to receive the tube block about the outlet in a fluid-tight manner, the flange is plate-like and has a surrounding bolting region that is formed about the tube block, and the flange extends transversely to a flow direction of the medium to be cooled;

wherein the flange is formed in two layers in the bolting region including a first material layer and a second material layer;

in the bolting region, multiple beads for stiffening the bolting region are formed; and within the beads, openings for applying a fluxing agent between the first and second material layers are formed in the first material layer or in the second material layer.

2. The heat exchanger according to claim 1, wherein the first material layer is formed by a material of the flange and [[a]] the second material layer by a separate plate-like frame.

3. The heat exchanger according to claim 2, wherein the plate-like frame is formed from a plate.

4. The heat exchanger according to claim 1, wherein the first material layer is formed from a material of the flange and the second material layer by a folding of the first material layer.

5. The heat exchanger according to claim 2, wherein the first material layer and the second material layer are connected to one another in an integrally bonded manner.

6. The heat exchanger according to claim 5, wherein the first material layer and the second material layer are soldered to one another.

7. The heat exchanger according to claim 1, wherein the flange is formed from a metal plate.

8. The heat exchanger according to claim 7, wherein the plate has a thickness between approximately 1.5 mm and approximately 2.5 mm.

9. The heat exchanger according to claim 1, wherein on the flange outside the bolting region, a surrounding receiving contour is formed, in which the tube block is received in the flow direction of the medium to be cooled and connected to the flange in an integrally bonded manner.

10. The heat exchanger according to claim 3, wherein the plate-like frame is formed from a steel plate.

11. The heat exchanger according to claim 4, wherein the first material layer is folded by approximately 180 degrees to form the second material layer.

12. A heat exchanger for a motor vehicle, comprising:

a tube block including multiple first medium channels and multiple second medium channels, the first medium channels extend from an inlet of the tube block to an outlet of the tube block, and a medium to be cooled flows through the first medium channels and a cooling medium flows through the second medium channels; and a flange configured to receive the tube block about the outlet in a fluid-tight manner, the flange is plate-like and has a surrounding bolting region that is formed about the tube block, and the flange extends transversely to a flow direction of the medium to be cooled;

wherein the flange is formed in two layers in the bolting region, a first material layer is formed from a material of the flange and a second material layer by a folding of the first material layer; and the first material layer and the second material layer are soldered to one another.

13. The heat exchanger according to claim 12, wherein in the bolting region, multiple beads for stiffening the bolting region are formed.

14. The heat exchanger according to claim 13, wherein within the beads, openings for applying a fluxing agent between the first and second material layers are formed in the first material layer or in the second material layer.

15. A heat exchanger for a motor vehicle, comprising:

a tube block having an inlet fluidly connected to an outlet;

one or more first medium channels extending from the inlet to the outlet;

one or more second medium channels extending from a second inlet to a second outlet; and a flange configured to receive at least a portion of the tube block, the flange including a bolting region and disposed proximate the outlet wherein the flange is formed in two layers in the bolting region, a first material layer is formed from a material of the flange and a second material layer by a folding of the first material layer; and the first material layer and the second material layer are soldered to one another.

16. The heat exchanger according to claim 15, wherein a first fluid flows through the one or more first medium channels, and a second fluid different than the first fluid flows through the one or more second medium channels.

17. The heat exchanger according to claim 15, wherein a surrounding portion of the flange extends transversely to a flow direction of the one or more first medium channels.

* * * * *